United States Patent [19]

Kelland et al.

[11] Patent Number: 5,187,025
[45] Date of Patent: Feb. 16, 1993

[54] UNITIZED FUEL CELL STRUCTURE

[75] Inventors: James W. Kelland, E. Walpole; Stephan G. Braun, Newton, both of Mass.

[73] Assignee: Analytic Power Corp., Boston, Mass.

[21] Appl. No.: 824,414

[22] Filed: Feb. 3, 1992

[51] Int. Cl.[5] .............................................. H01M 8/10
[52] U.S. Cl. ....................................... 429/33; 429/36; 429/40
[58] Field of Search ...................... 429/33, 30, 34–36, 429/40, 192, 152, 16

[56] References Cited

U.S. PATENT DOCUMENTS

| | | | |
|---|---|---|---|
| 2,913,511 | 11/1959 | Grubb, Jr. | 429/30 |
| 3,143,440 | 8/1964 | Hunger et al. | 429/30 |
| 3,202,547 | 8/1965 | Rightmire et al. | 429/34 |
| 3,382,105 | 5/1968 | McBryar et al. | 429/30 |
| 3,418,168 | 12/1968 | Wentworth | 429/34 X |
| 3,432,355 | 3/1969 | Niedrach et al. | 429/42 |
| 4,175,165 | 11/1979 | Adlhart | 429/30 |
| 4,215,183 | 7/1980 | MacLeod | 429/30 |
| 4,579,788 | 7/1986 | Marianowski et al. | 426/36 X |

*Primary Examiner*—Anthony Skapars

[57] ABSTRACT

The purpose of invention is to extend the edge of an electrochemical cell with a laminated plastic structure to give it strength and rigidity for sealing and support. The invention applies to polymer exchange membrane fuel cells and electrochemical compressors. In the present invention the electrolyte membrane is surrounded with a plastic spacer having a thickness closely matched to that of the membrane. A thin, plastic film is bonded with an adjesive layer to both sides of the two elements so that the film and adhesive bridge the gap between the spacer and membrane. The resulting composite membrane has the properties of conventional ion exchange membranes in its electochemically active region, while possessing the favorable mechanical properties of plastic laminates in the surrounding frame area. The adhesive layer bonds the assembly together and also provides a gas tight seal around the edge of the membrane.

Porous electrodes with plastic frames are bonded to the composite membrane. The use of this type of structure permits the construction of a rigid cell frame which can be made the same thickness as the membrane electrode package. The structural strength which is thereby imparted to this unitized cell simplifies sealing of the cell.

6 Claims, 2 Drawing Sheets

UNITIZED FUEL CELL STRUCTURE

BACKGROUND OF THE INVENTION

1. Field of the Invention

This patent applies to proton exchange membrane electrolyte fuel cells and electrochemical compressors. In particular it applies to polymeric proton exchange membrane (PEM) fuel cells and electrochemical compressors.

2. Description of Prior Art

Present construction of polymer exchange membrane (PEM) fuel cells has evolved from such designs as those of Grubb, Niedrach, and Adlhart, among others. All of these designs employ reactant gas seals which have at least one sealing surface which directly contacts the membrane electrolyte. This requires that the ion exchange membrane itself be extended outside of the active catalytic area of the cell. These designs require the membrane to bridge gaps in cell components such as reactant gas flow fields. Such designs typically result in exposure of the membrane edge to ambient air and/or cooling liquid as well. Since most ion exchange membranes are not very strong, bridging of gaps in cell components can result in high mechanical stresses in and eventually failure of the membrane. Such construction often requires either the use of strong, solid, flow field materials such as graphite, or limitation of the cell to low differential pressures. Exposure of the membrane to ambient air can result in drying of the membrane and exposure to cooling liquid creates the possibility for metal ion contamination. Both of these effects reduce the performance of the fuel cell. In present designs, the membrane can be subjected to substantial mechanical loads created both during and after stack assembly. These loads arise from the compression of seals and/or gaskets and creep of components after assembly. Another disadvantage of present cells is that they are inherently difficult to handle and store since the membrane is unprotected. A very important feature of this invention is that it minimizes the use of the most expensive elements of the conventional PEM fuel cell, which are the carbon paper components such as the electrode, and the membrane.

Accordingly, it is an object of the present invention to provide an inexpensive structure which minimizes the use of expensive components such as the membrane electrolyte and the electrodes.

Another object of the present invention is to provide for ease and low cost of manufacture by minimizing the number of thermal and pressure bonding steps required in cell construction.

Another object of the present invention is to provide a membrane support structure which minimizes the unsupported exposure of the membrane to high differential pressure.

Yet another object of the present invention is to provide a cell structure which is impervious to gas leakage from the oxidant to fuel or fuel to oxidant side of the cell.

Still another object of the present invention is to eliminate electrical short circuits between anode and cathode electrodes which may occur due to the relative movements of cell parts either during fabrication or during use.

Still another object of the present invention is to provide a structure which minimizes the exposure of the electrolyte membrane to the coolant or to ambient air as well as to provide protection against mechanical damage during handling and storage.

SUMMARY OF THE INVENTION

The unitized cell is the product of a set of unique materials and fabrication procedures. The unitized cell approach uses plastic laminates to extend a rigid "frame" in the plane of the cell, while simultaneously effecting a gas tight seal around the membrane edge. The unitizes cell performs two completely different functions. It has a region dedicated to power generation and, a region dedicated to providing structural and sealing support. By keeping the membrane confined to the active area of the cell (the only region where it is needed), all contact of the membrane with the ambient air or cooling fluid is eliminated. Gaps between cell components are no longer bridged by the membrane. This function is taken over by the rigid, laminated cell frame.

The new structure significantly reduces the amount of membrane and electrode material required in the cell. These are a significant percentage of cell cost. Since the membrane does not bridge component gaps, lighter, less expensive flow field and electrode materials can be used. The structure also permits the use of thinner electrolyte membranes having higher performance. Tight tolerances can also be eliminated, allowing the use of inexpensive die cutting operations instead of machining. The invention permits high cell cross pressures from cathode to anode, or vice versa. This is often advantageous in fuel cells, and is a requirement in electrochemical compressors. The rigid cell frame also provides the opportunity for adhesive bonding of an entire stack of cells. Sealing materials may be used in the frame area that could not be used in direct contact with the membrane because of attack by sulfonic acid. The unitized cell is rugged and easy to handle and store since the membrane edge is enclosed in the rigid plastic frame. All of these benefits will contribute significantly to the future production and manufacture of PEM fuel cells.

BRIEF DESCRIPTION OF THE DRAWINGS

DRAWING NO. 1—This drawing presents a plan view of a fuel cell. Typically, a bipolar cell of this type has an active area surrounded by a frame area. The active area is the region of the cell where catalyst is found and the frame area is that portion of the cell used for sealing the reactants.

The cell shown has internal manifolds numbered (8) through (13). It has a cell frame (7) peripherally disposed about a porous electrode (3) and bolt holes (14). The area (3) of the porous electrode is often referred to as the active, or electrochemically active area of the cell. The cell shown is designed to be stacked in a bipolar fashion to form a cell stack. Such cell stacks are well known in the art and virtually all modern fuel cells are constructed in such a manner. The cell is shown having internal manifolds and being circular in shape. It is advantageous to manufacture cells in such a shape if they will be subjected to elevated internal pressures. Other shapes, such as rectangular are often used where the reactant pressure is near one atmosphere. A PEM fuel cell requires manifolds for fuel inlet (9) and fuel exit (12), oxidant inlet (10) and oxidant exit (13); and coolant inlet (8) and coolant exit (11). In some cases the coolant manifolds are not required.

Figure 1:
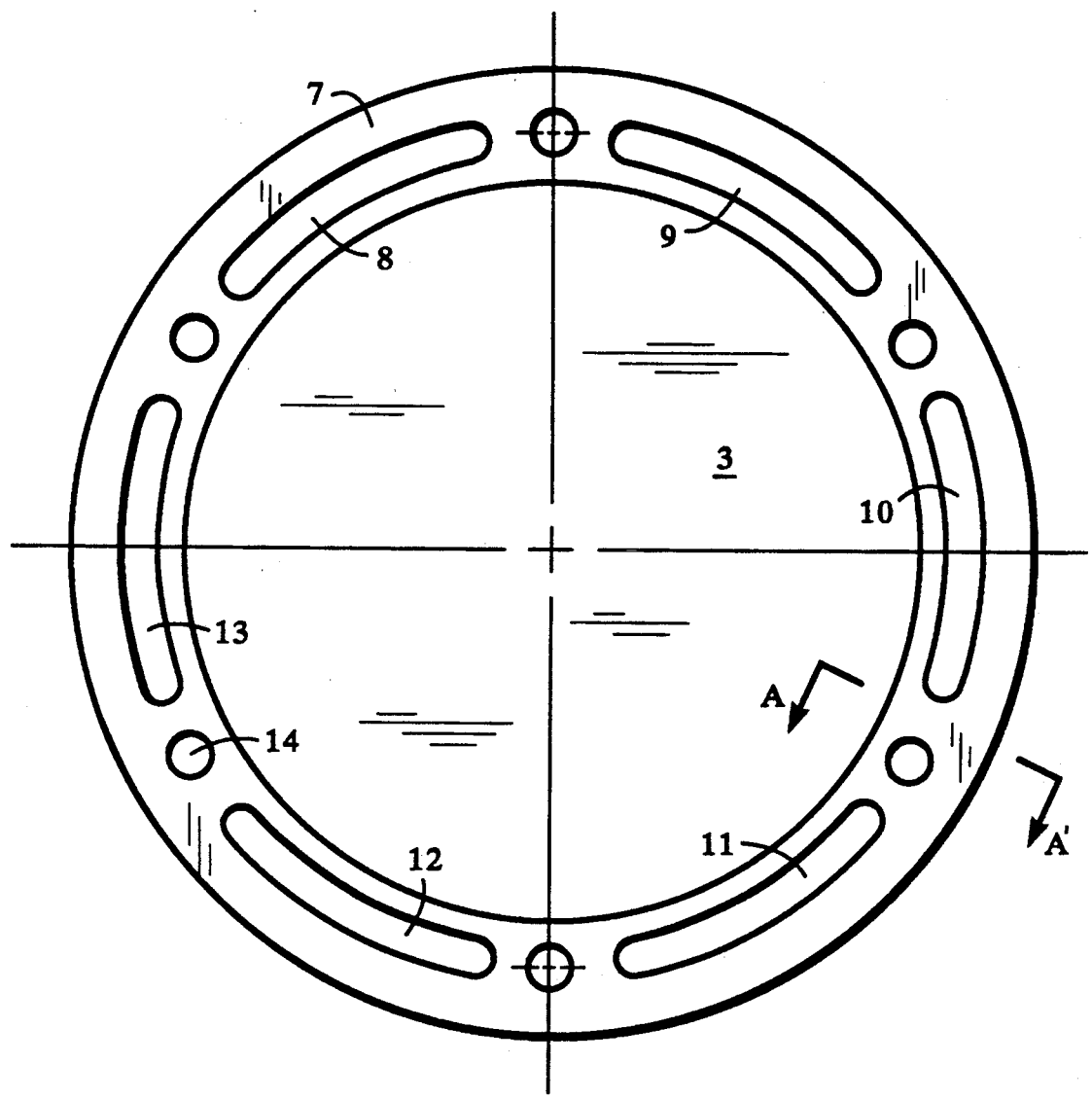
Figure 2:
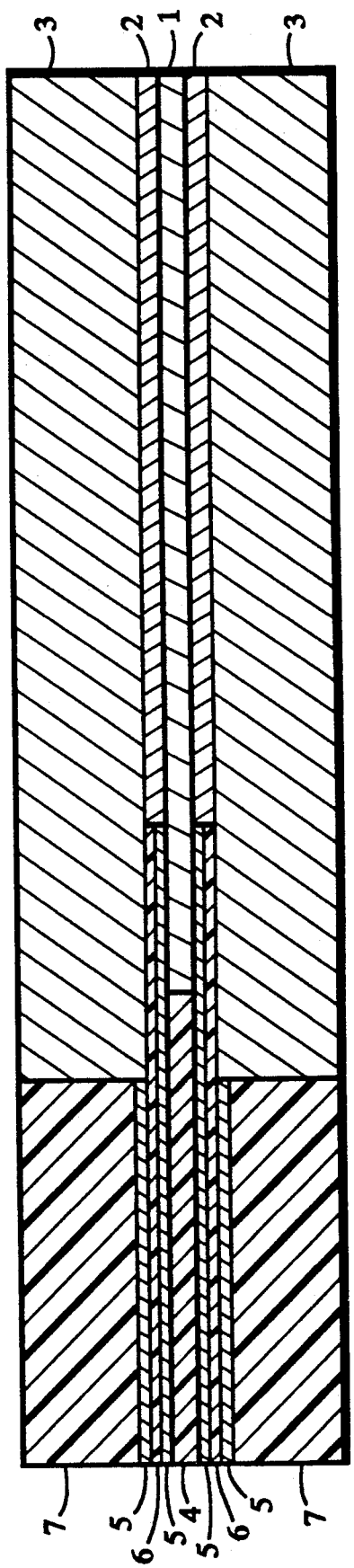

DRAWING NO. 2—This drawing depicts a partial crossection through the unit cell at some point between a bolt hole and a manifold shown in Drawing No. 1 as section A/A'. The section includes all of the cell frame and part of the active area. In PEM cells, the anode side and cathode sides of the cell are often symmetric if not identical. Hence, if the porous electrode (3) at the top of the drawing is the anode then the porous electrode (3) at the bottom of the drawing is the cathode, and vice versa. The active area of the cell includes the porous electrodes (3), the catalyst layers (2), and the membrane (1). The frame is comprised of electrode frames (7) and two frame bridges (6) which sandwich the membrane (1) and the membrane frame (4). The entire structure is held together with adhesive layers (5).

PREFERRED EMBODIMENT OF THE INVENTION

An embodiment of the invention is shown in Drawings 1 and 2. In the preferred embodiment of the invention, the porous electrodes (3) are die cut from sheets of carbon paper. The paper may be of the polyacrylonitrile (PAN) carbon fiber or a pitch fiber. The thickness of the electrodes are typically about 6 to 12 thousandths of an inch thick. Such electrode materials are commercially available from the Toray and Kreha companies in Japan. The catalyst layers (2) shown in Drawing No. 2 may be carbon supported platinum, Teflon bonded structures as is commonly used in PEM fuel cells. Alternatively, the catalyst layer may be made by direct catalyzation of the membrane as described by Los Alamos National Laboratory or by a Teflon bonded platinum black structure which was originally developed by the General Electric Company. The embodiment of the present invention is viable with any of these catalyst structures or a combination of these structures. In the preferred embodiment, the carbon supported, platinum catalyzed catalyst layer is thermally bonded to a wetproofed electrode.

The membrane (1) is die cut from sheets of proton exchange membrane such as manufactured by DuPont under the name of Nafion. Alternatively, anion exchange membranes may be used as well. The electrode frames (7) and the plastic membrane spacers (4) are also die cut from a material such as polyethylene terephthalate polyester. The thickness of the spacers are chosen so that the sum of component thicknesses in the frame will be equal to or slightly less than the thickness of the active portion of the cell, after assembly. Finally, the adhesive layers (5) are die cut from acrylic adhesive films. The adhesive layers are generally supplied with protective paper backings on each side for ease of handling.

The cell is assembled by placing a electrode frame (7) and a catalyzed porous electrode (3) on a press platen designed to maintain the registry of all parts. Next we peel a protective paper backing from one of the die cut adhesive layers (5) and drop it into place on the electrode frame (7). With the adhesive layer in place, we peel its other paper backing layer and continue with the assembly. The cell is constructed in this manner by assembling parts from the bottom up as shown in Drawing No. 2. When the cell is fully assembled, we place another press platen on top of the structure. The cell, sandwiched between the platens, is placed in a press. The entire structure is now heated and pressed to the point where the catalyst layers bond to the membrane. The time, pressure and temperature of the bonding process is generally a function of the type of membrane used. Typical bonding specifications are a time of about 90 seconds, a pressure of 300 psi at the surface of the membrane and a temperature of about 320° F. When the cell is removed from the press, the thickness dimension of the cell frame is about equal to the thickness dimension of the active area.

SECOND EMBODIMENT OF THE INVENTION

In a second embodiment of the invention, the electrode frame is not die cut. In this case, the frame is formed integral to the cell by insert injection molding or casting. In this process, the porous carbon electrode is placed in an injection molding die. A thermoplastic such as polyvinylidene difluoride is forced under heat and pressure into the die. In addition to filling the empty portion of the die, it also flows a short distance into the porous electrode. The resulting structure is a single unit after the molding process. In an insert casting process, the thermoplastic may be replaced by a thermosetting epoxy resin.

THIRD EMBODIMENT OF THE INVENTION

This embodiment is more useful for electrochemical compressors where plated, porous titanium is substituted for the porous carbon material. Compressor electrodes such as oxygen anodes operate at potentials which will damage porous carbon materials. Or if very high pressures are required which cannot be supported by porous carbon plated porous titanium electrodes may be substituted. Additionally, the porous metal may be niobium or zirconium. The plating may be platinum or gold. Generally plating is required because of the tendency of these metals to form oxides. These metals are advantageous because of their limited aqueous chemistry. Other materials tend to replace hydrogen in proton exchange membranes.

While this invention has been shown and described in connection with a particular preferred embodiment, it is apparent that various changes and modifications, in addition to those mentioned above may be made by those who are skilled in the art without departing from the basic features of the invention. Accordingly, it is the intention of the applicant to protect all variations and modifications within the spirit and scope of the invention.

Having thus described a typical embodiment for our invention, that which we claim as new and desire to secure by Letters Patent of the United States is:

1. An electrochemical cell comprised of an electrochemically active area surrounded by an electrochemically inactive frame area, the active area being comprised of a catalyzed polymer exchange membrane electrolyte disposed between two porous electrodes and the frame area being comprised of two electrode frames, two layers of plastic film and one plastic membrane spacer; layers of adhesive film are placed between each plastic layer in the frame and each adhesive layer extends from the outer edge of the cell radially inwards to a region under the porous electrode layer.

2. An electrochemical cell as in claim 1 where all components are die cut prior to assembly.

3. An electrochemical cell as in claim 1 where the adhesive layer is an acrylic film.

4. An electrochemical cell as in claim 2 where the frame electrode spacers and the membrane spacer are made from thermoplastics.

5. An electrochemical cell as in claim 1 where the electrode frame and plastic film are formed with the porous electrodes via insert injection molding of a thermoplastic.

6. An electrochemical cell as in claim 1 where the electrode frame is formed integral with the porous electrodes via insert casting of an epoxy.

* * * * *